United States Patent
Yamashita et al.

(10) Patent No.: US 7,729,851 B2
(45) Date of Patent: Jun. 1, 2010

(54) NAVIGATION SYSTEM

(75) Inventors: Atsushi Yamashita, Kanagawa (JP); Ryoichi Ogishima, Saitama (JP)

(73) Assignee: Panasonic Corporation, Osaka (JP)

( * ) Notice: Subject to any disclaimer, the term of this patent is extended or adjusted under 35 U.S.C. 154(b) by 809 days.

(21) Appl. No.: 11/568,733

(22) PCT Filed: Mar. 4, 2005

(86) PCT No.: PCT/JP2005/003725
§ 371 (c)(1),
(2), (4) Date: Nov. 6, 2006

(87) PCT Pub. No.: WO2005/108927
PCT Pub. Date: Nov. 17, 2005

(65) Prior Publication Data
US 2007/0225905 A1 Sep. 27, 2007

(30) Foreign Application Priority Data
May 11, 2004 (JP) .............................. 2004-141219

(51) Int. Cl.
G01C 21/26 (2006.01)
G08G 1/0969 (2006.01)
G09B 29/00 (2006.01)

(52) U.S. Cl. .................................. 701/208; 340/995.1

(58) Field of Classification Search .................. None
See application file for complete search history.

(56) References Cited

U.S. PATENT DOCUMENTS 4,513,377 A  4/1985 Hasebe et al.
5,157,614 A * 10/1992 Kashiwazaki et al. ....... 701/200
6,199,012 B1 * 3/2001 Hasegawa .................... 701/208
6,233,521 B1 * 5/2001 Nomura ....................... 701/208
6,600,993 B1 * 7/2003 Kaneko et al. .............. 701/208
6,889,134 B2 * 5/2005 Nakane et al. .............. 701/202
6,954,153 B2 * 10/2005 Choi ....................... 340/995.12
2002/0128771 A1 * 9/2002 Nagaki ....................... 701/208

FOREIGN PATENT DOCUMENTS

| JP | 57-206817 A | 12/1982 |
| JP | 60-67818 A | 4/1995 |
| JP | 07-209011 A | 8/1995 |
| JP | 2001-153674 A | 6/2001 |
| JP | 2002-195838 A | 7/2002 |

OTHER PUBLICATIONS

International Search Report for Application No. PCT/JP2005/003725, dated Jun. 7, 2005.

* cited by examiner

Primary Examiner—Michael J. Zanelli
(74) Attorney, Agent, or Firm—RatnerPrestia (57) ABSTRACT

A navigation system comprises: a GPS for detecting a current position; a DVD drive for reading a map from a DVD on which a plurality of partially overlapping maps are recorded; a Memory card for storing information to identify a portion overlapping with another map, in a map being used for navigation; and a CPU for judging, based on coordinates of a current position and the information stored in the Memory card, whether the coordinates of the current position are contained in the overlapping portion or not, and for controlling, in response to a judgment that the coordinates of the current position are contained in the overlapping portion, the DVD drive to read from the DVD the map sharing the overlapping portion. Consequently, map data to be loaded can be smoothly changed according to the current position.

6 Claims, 6 Drawing Sheets

NAVIGATION SYSTEM

This application is a U.S. National Phase Application of PCT International Application PCT/JP2005/003725.

TECHNICAL FIELD

The present invention relates to a navigation system for navigating with the use of map data recorded on a recording medium.

BACKGROUND ART

Conventional navigation systems have been performed navigation by reading map information recorded on DVDs.

A navigation system capable of playing back a desired DVD during navigation is described in Japanese Published Patent Application No. 2001-153674. The navigation system described in the patent document comprises a GPS receiving section for detecting a current position, a DVD-ROM drive, and a hard disk. When the DVD-ROM drive detects a DVD ejection operation, map data for a specified area is transferred from the DVD to the hard disk according to a current position detected by the GPS receiving section. At this time, a block map around a current position of a vehicle or on the route to a destination is transferred to the hard disk. After the DVD is ejected, the navigation system performs the navigation operation including a display process, using the map data on the hard disk.

DISCLOSURE OF THE INVENTION

Problems to be Solved by the invention

The above-mentioned navigation system, however, has had troubles in processes because, when the system performs a navigation operation, a plurality of block map data are required to be loaded at the same time in the vicinity of boundaries between each block map. If the vehicle moves into an area on a map that was not transferred to the hard disk, the system suddenly becomes incapable of reading map data and may stop the navigation operation.

A purpose of the invention made to solve the conventional problems is to provide a navigation system capable of smoothly changing map data to be loaded according to a current position.

Means for Solving the Problems

A navigation system of the invention has a configuration comprising: a reading unit for reading a map from a recording medium on which a plurality of partially overlapping maps are recorded; a storage unit for storing information to identify a portion overlapping with another map, in a map being used for navigation; and a control unit for judging, based on coordinates of a current position and the information stored in the storage unit, whether the coordinates of the current position are contained in the overlapping portion or not, and for controlling, when the coordinates of the current position are judged to be contained in the overlapping portion, the reading unit to read from the recording medium the map sharing the overlapping portion. Here, the above-mentioned reading unit may read a map from a portable recording medium inserted therein. The above-mentioned control unit, when coordinates of a current position are judged to be contained in the overlapping portion, may induce a user to insert the recording medium into the reading unit. A memory card may be used as the recording medium.

A navigation system of another aspect of the invention has a configuration comprising: a display unit for displaying a map in a scrollable manner; a reading unit for reading a map from a recording medium on which a plurality of partially overlapping maps are recorded; a storage unit for storing information to identify a portion overlapping with another map, in a map being displayed on the display unit; and a control unit for judging, based on an area displayed on the display unit and the information stored in the storage unit, whether the overlapping portion stored in the storage unit is contained in the area displayed on the display unit or not, and for controlling, when the overlapping portion is judged to be contained in the area displayed on the display unit, the reading unit to read from the recording medium the map sharing the overlapping portion.

A computer-readable recording medium of the invention has: a plurality of partially overlapping maps; and identification information to identify a portion overlapping with another map in each of the maps, the maps and the information being recorded on the computer-readable recording medium in association with each other.

There are other aspects of the invention as described below. This disclosure of the invention therefore intends to provide part of aspects of the invention and does not intend to limit the scope of the claimed invention.

BEST MODE OF EMBODYING THE INVENTION

Now, the invention will be described in detail. However, the following detailed description and appended drawings are not intended to limit the invention. The scope of the invention is defined by the appended claims.

A navigation system of the embodiment has a configuration comprising: a reading section for reading a map from a recording medium on which a plurality of partially overlapping maps are recorded; a storage section for storing information to identify a portion overlapping with another map, in a map being used for navigation; and a control section for judging, based on coordinates of a current position and the information stored in the storage section, whether the coordinates of the current position are contained in the overlapping portion or not, and for controlling, when the coordinates of the current position are judged to be contained in the overlapping portion, the reading section to read from the recording medium the map sharing the overlapping portion.

Consequently, when coordinates of a current position are contained in a portion overlapping with another map, the map sharing the overlapping portion is controlled to be read, so that maps to be used for navigation can be changed smoothly.

In the navigation system, the reading section may read a map from a portable recording medium inserted therein.

Consequently, the recording medium on which a map is recorded can be carried freely and does not require to be kept to the navigation system, and user convenience can be increased.

In the navigation system, the control section, the coordinates of a current position are judged to be contained in the overlapping portion, may induce a user to insert the recording medium into the reading section.

Consequently, the recording medium has to be inserted into the reading section only when a map is read. When not reading a map, the reading section can read information (other than a map) from a different recording medium than the recording medium on which a map is recorded. A configuration in which a message is displayed, for example, can be adopted as the configuration for inducing a user to insert the recording medium.

In the navigation system, the recording medium is a memory card.

Using a memory card as the recording medium allows the navigation system to be highly versatile and convenient.

A navigation system of another aspect of the embodiment has a configuration comprising: a display section for displaying a map in a scrollable manner; a reading section for reading a map from a recording medium on which a plurality of partially overlapping maps are recorded; a storage section for storing information to identify a portion overlapping with another map, in a map being displayed on the display section; and a control section for judging, based on an area displayed on the display section and the information stored in the storage section, whether the overlapping portion stored in the storage section is contained in the area displayed on the display section or not, and for controlling, the overlapping portion is judged to be contained in the area displayed on the display section, the reading section to read from the recording medium the map sharing the overlapping portion.

Consequently, maps can be changed smoothly when the maps are scrolled to move from a map showing a certain area to a map showing another area, and a comfortable map display can be realized.

A computer-readable recording medium of the embodiment has: a plurality of partially overlapping maps; and identification information to identify a portion overlapping with another map in each of the maps, the maps and the information being recorded on the computer-readable recording medium in association with each other.

Having a computer read from the recording medium allows the plurality of maps and the identification information on the overlapping portion in each of the maps to be read in association with each other. Accordingly, each map and the overlapping portion can be processed by software in association with each other, and the maps recorded on the recording medium can be processed appropriately.

Now, the navigation system of the embodiment of the invention will be described with reference to the drawings.

Figure 1:
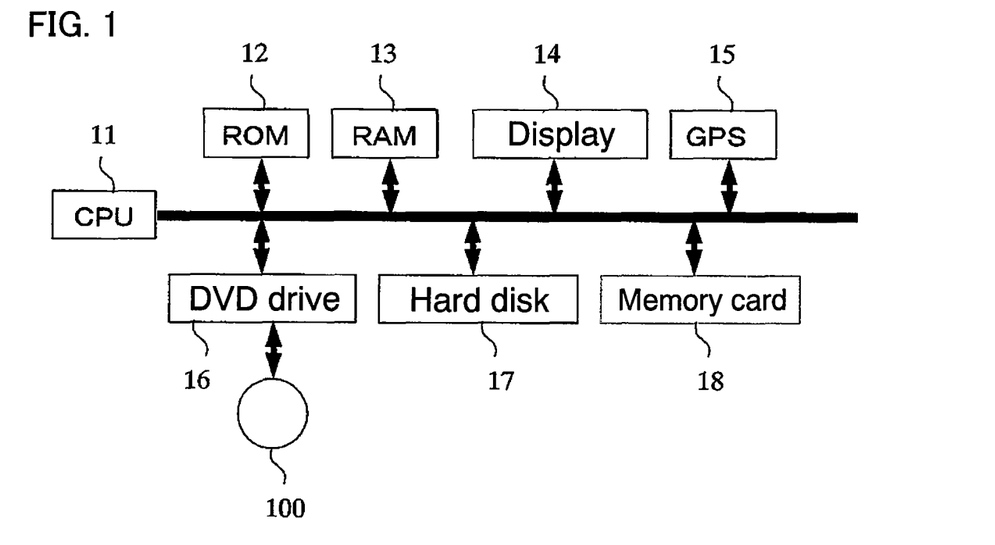
FIG. 1 is a block diagram of a navigation system according to an embodiment of the invention.

FIG. 1 is a block diagram of a navigation system according to an embodiment of the invention. As shown in FIG. 1, the navigation system according to the embodiment comprises: a CPU 11 which is connected with each component of the navigation system and generally controls the navigation operation; a ROM 12 for storing a control program; a RAM 13 for temporarily holding in-process data; a display 14 for displaying map data; a GPS 15 for detecting a current position; a DVD drive 16 for reading map data from a DVD 100 inserted therein; and a Hard disk 17 and Memory card 18 for reading and writing map data.

Figure 2:
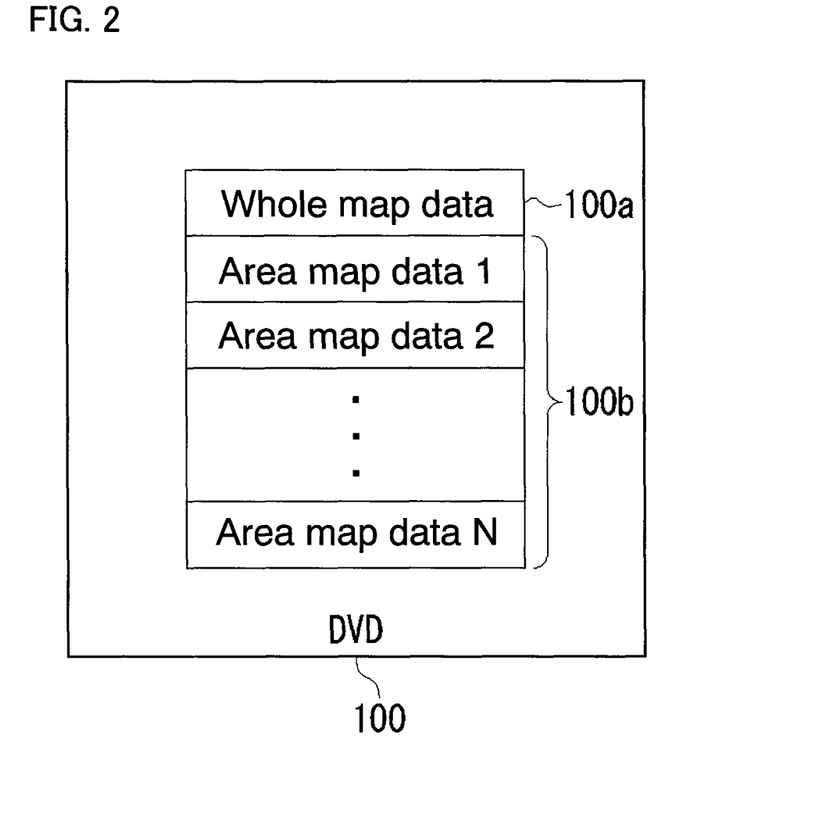
FIG. 2 shows an example of a data structure of map data recorded on a DVD.

FIG. 2 shows a structure of map data recorded on the DVD 100. The DVD 100 of the embodiment has: regular whole map data 100a; and area map data 100b obtained by dividing the whole map into a plurality of areas, the whole map data 100a and the area map data 100b being recorded on the DVD 100.

Figure 3:
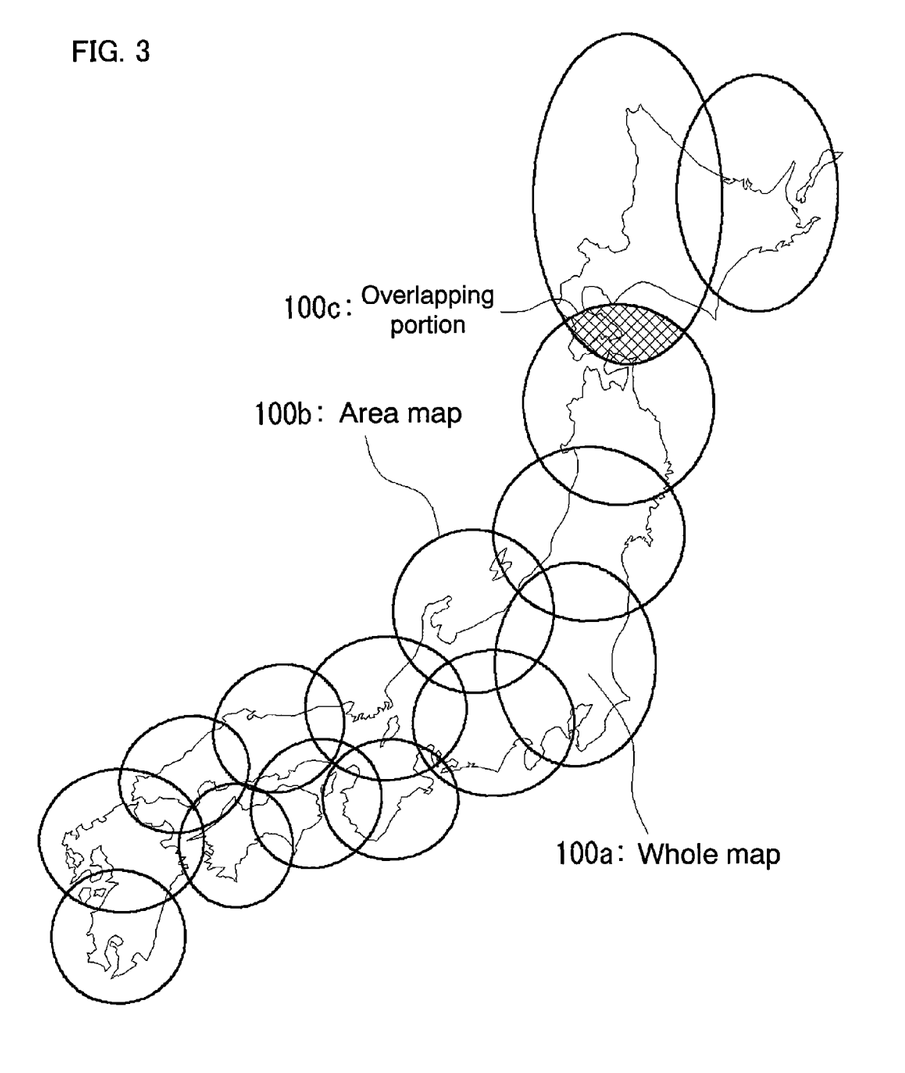
FIG. 3 illustrates area map data to be transferred.

FIG. 3 illustrates the area map data 100b obtained by dividing the map data into a plurality of areas. As shown in FIG. 3, in a case where the whole map 100a is, for example, a map of the whole of Japan, each area map data 100b is created by dividing the whole map data 100a into a plurality of areas. Each area map data 100b has a portion 100c overlapping with adjacent area map data 100b. The overlapping portion 100c has an attribute indicating that it is an overlapping portion. The area map data 100b created in this way is recorded on the DVD 100 along with the whole map 100a.

An operation of the navigation system configured as above will be described. Prior to a description with reference to the drawings, an outline will be given on the operation of the navigation system.

The navigation system transfers the whole map data 100a recorded on the DVD 100 and the area map data 100b required for navigation to the Hard disk 17 or to the Memory card 18. The navigation system performs navigation using map information stored in the Hard disk 17 or in the Memory card 18. Consequently, the DVD 100 does not exclusively use the DVD drive 16 during navigation, so that a DVD other than the DVD 100 having the map recorded thereon can be played back.

Now, the operation of the navigation system will be described with reference to FIGS. 4 to 7. In the following description, an example will be described where navigation is performed with the data on the DVD 100 transferred to the Memory card 18. As described above, navigation can also be performed with the data in the Hard disk 17 transferred from the DVD 100.

Figure 4:
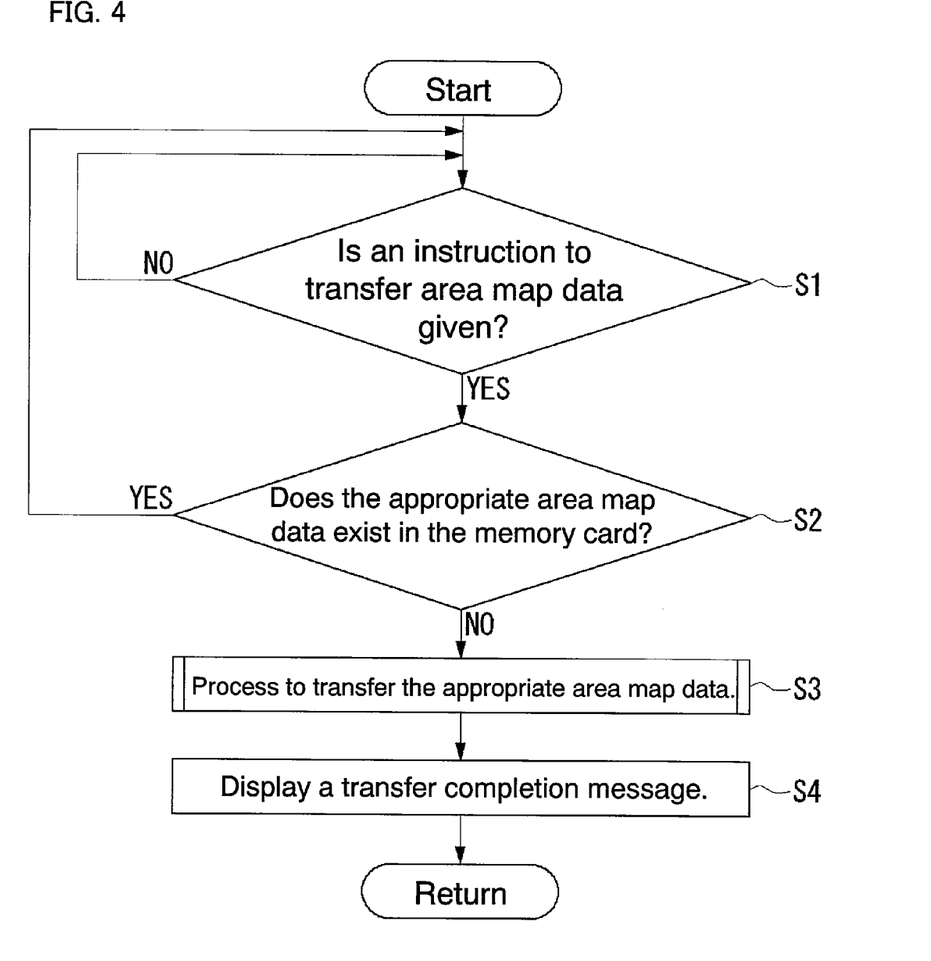
FIG. 4 is a flowchart illustrating a map data transfer process.

FIG. 4 is a flowchart showing a general flow of a transfer process of the area map data 100b in the navigation system. As shown in FIG. 4, the CPU 11 continuously monitors whether an instruction to transfer the area map data 100b is given (S1), and if an instruction to transfer is given (YES at S1), the CPU 11 judges whether the appropriate area map data 100b is stored in the Memory card 18 or not, that is, whether the transfer is done or not (S2). If the appropriate area map is not stored in the Memory card 18 (NO at S2), the CPU 11 performs the process to transfer the area map data 100b from the DVD 100 to the Memory card 18 (S3). If the appropriate area map data 100b is already stored in the Memory card 18 (YES at S2), the CPU 11 continues to monitor whether an instruction to transfer is given or not. When the transfer process of the area map data 100b is completed, a message indicating the completion of the transfer is displayed (S4), and the transfer process of the area map data 100b is finished.

Figure 5:
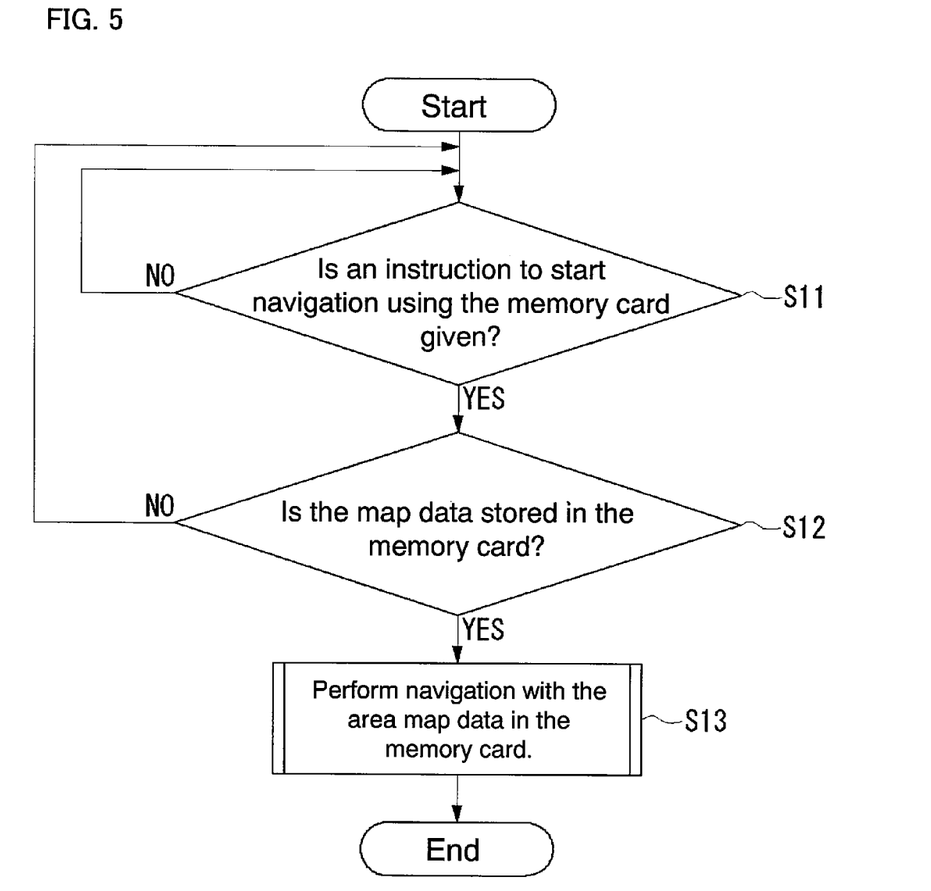
FIG. 5 is a flowchart illustrating an operation to change map data to be loaded in a navigation operation from a DVD to a memory card.

FIG. 5 is a flowchart showing a general flow of a startup of the navigation operation using the area map data 100b stored in the Memory card 18. As shown in FIG. 5, the CPU 11 continuously monitors whether an instruction to start navigation using the Memory card 18 is given or not (S11). For example, when more detailed navigation than navigation using the whole map data 100a is desired, a user instructs to do navigation using the area map data 100b stored in the Memory card 18. When the instruction to change to a navigation operation using the Memory card 18 is given (YES at S11), the CPU 11 judges whether the appropriate area map data 100b is stored in the Memory card 18 or not (S12). If the appropriate area map data 100b is stored in the Memory card 18 (YES at S12), the CPU 11 reads the area map data 100b from the Memory card 18 and performs the navigation operation (S13). If the appropriate area map data 100b is not stored in the Memory card 18 (NO at S12), navigation using the Memory card 18 is not started, and the CPU 11 continues to monitor whether an instruction to start navigation using the Memory card 18 is given or not. Here, the area map data 100b stored in the Memory card 18 contains information to identify a portion overlapping with another map. Using the identification information stored in the Memory card 18, the CPU 11 can judge whether coordinates of a current position detected by the GPS 15 are contained in the overlapping portion of the map being used for navigation or not.

Figure 6:
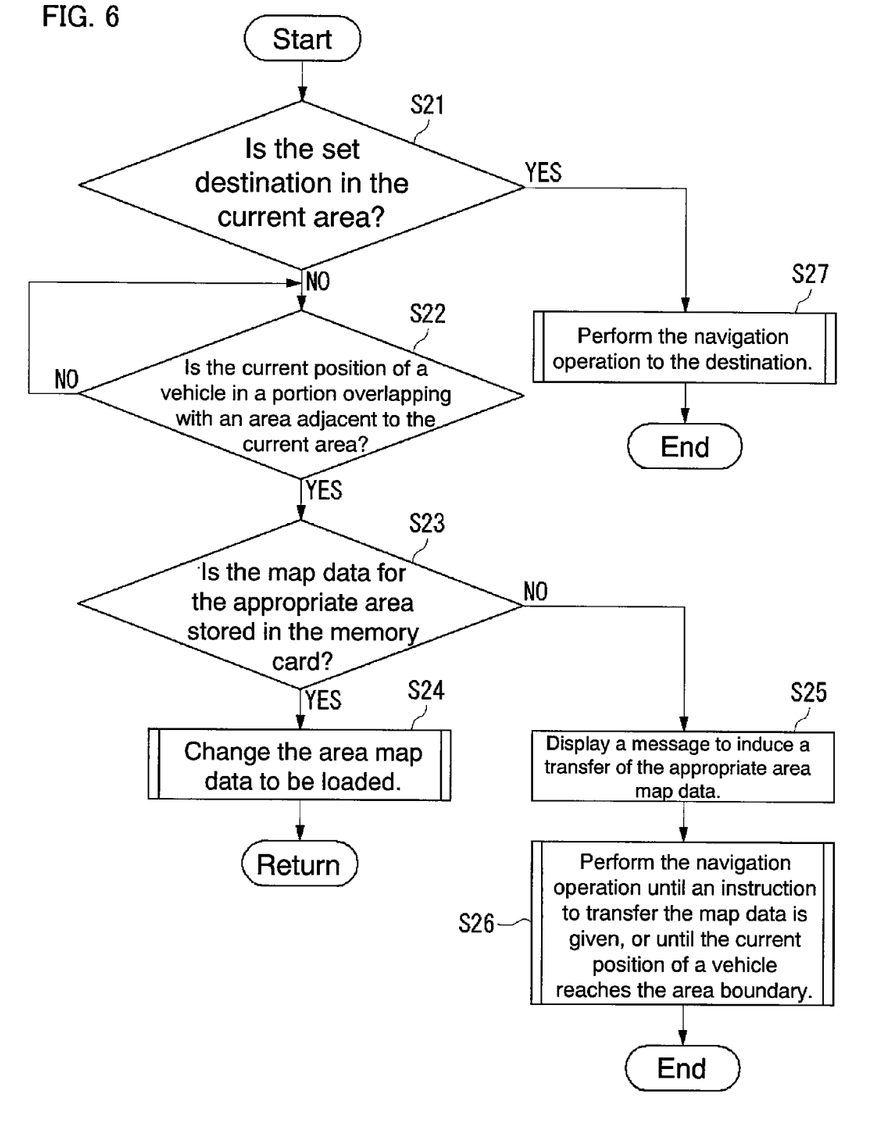
FIG. 6 is a flowchart illustrating an operation to change an area map to be loaded.

FIG. 6 is a flowchart showing a flow of an operation to change the area map data 100b to be loaded into the Memory card 18. Before the navigation system enters the flow shown in FIG. 6, navigation is started according to the flow shown in FIG. 5 and is performed using the Memory card 18. That is, FIG. 6 shows an operation during navigation performance using the Memory card 18.

As shown in FIG. 6, the CPU 11 judges whether a destination set by a user is in a current area (S21). The "current area" is the area map data 100b containing the current position of the vehicle. If the judgment is that the destination is in the current area (YES at S21), the navigation operation is performed to the destination (S27) and is finished at a point in time when the vehicle reaches the destination.

If the result of the judgment whether the destination is in the current area or not is that the destination is not in the current area (NO at S21), the CPU 11 judges whether the current position is in a portion overlapping with an adjacent area (S22). If the result of the judgment whether the current position is in a portion overlapping with an area adjacent to the current area or not (S22) is that the current position is not in an overlapping portion (NO at S22), the CPU 11 continues to monitor whether the current position is in an overlapping portion or not. If the current position is in an overlapping portion (YES at S22), the CPU 11 judges whether the area map data 100b for the adjacent area is stored in the Memory card 18 (S23). If the map data for the adjacent area is stored in the Memory card 18 (YES at S23), the CPU 11 changes at an appropriate time the area map data 100b to be loaded (S24). After changing the map data, the CPU 11 again judges whether the destination is in the current area (S21), and continues the same process. If the result of the judgment whether the adjacent area map data 100b is stored in the Memory card 18 (S23) is that the data is not stored (NO at S23), a message is displayed to induce a transfer of the appropriate area map data 100b (S25). For example, the navigation system displays a message instructing a user to insert the DVD 100 into the DVD drive 16. If the DVD 100 is inserted into the DVD drive 16 as a result of the message, the CPU 11 performs a process of transferring the adjacent area map data 100b from the DVD 100 to the Memory card 18. The CPU 11 performs the transfer process according to the flow described in FIG. 4. The CPU 11 changes at an appropriate time the area map data to the adjacent area map data 100b. If the adjacent area map data 100b is judged not to be stored in the Memory card 18, the navigation system performs the navigation operation until, in response to the above-mentioned message display, the DVD 100 is inserted into the DVD drive 16 and an instruction to transfer the area map data 100b is given, or until the current position reaches the area boundary (S26).

Figure 7:
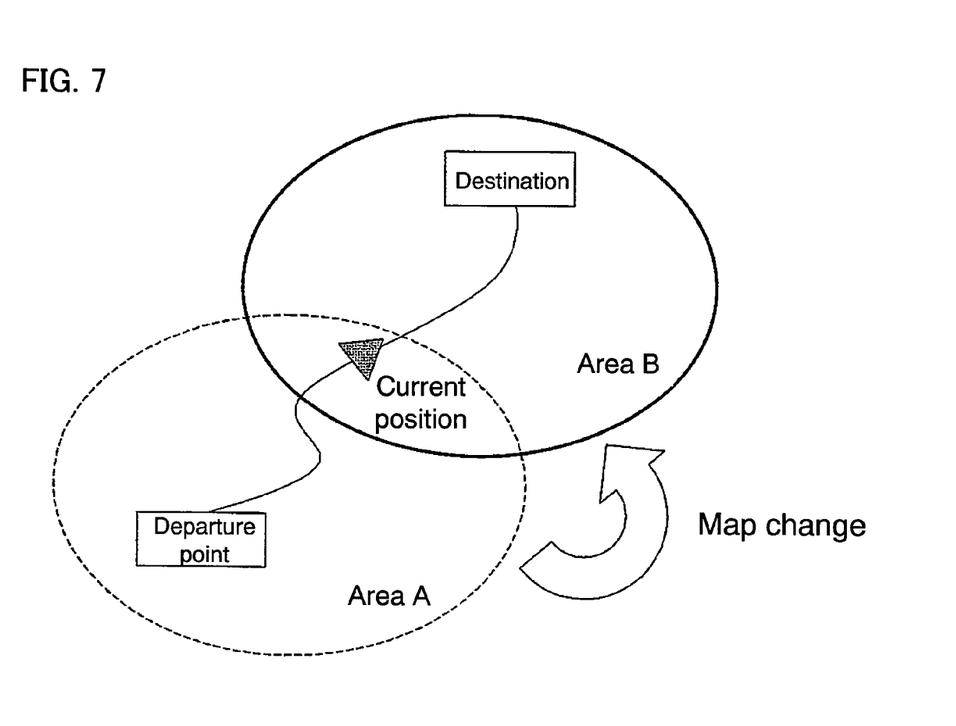
FIG. 7 illustrates an operation to change an area map to be loaded.

With reference to FIG. 7, the steps S22 to S24 of changing the area map data 100b will be described. In FIG. 7, a departure point is in an area A, a destination is in an area B, and a current position of a vehicle is in an overlapping portion between the areas A and B. In this case, the current position is judged to be in the portion overlapping between the current area and the adjacent area (YES at S22), and the CPU 11 judges whether the area map data 100b for the adjacent area B is stored in the Memory card 18 or not (S23). If the area map data 100b for the area B is stored, the CPU 11 changes at an appropriate time the area map data 100b to be loaded from the area A to the area B (S24).

As shown in FIG. 7, the situation when a vehicle is judged to be in an overlapping portion is when the vehicle is near a boundary of a current area (the area A) and the area map data 100b for the adjacent area B will soon be required. At this time, by the CPU 11 loading the adjacent area map data 100b, the area map data 100b to be required next can be prepared in the Memory card 18. In addition, the area map data 100b can be changed smoothly by the CPU 11 changing the area map data 100b for the area A to the area map data 100b for the area B at an appropriate time while the vehicle is moving through the overlapping portion.

As described above, in the navigation system of the embodiment, adjacent area map data 100b is controlled to be read when a current position of a vehicle is contained in a portion overlapping with the adjacent area map data 100b, so that maps to be used for navigation can be changed smoothly.

In the navigation system of the embodiment, the area map data 100b required for navigation is transferred from the DVD 100 to the Memory card 18 and is stored in the Memory card 18, so that the DVD drive 16 can be used during navigation. Consequently, for example, navigation can be performed on a front screen while a movie is played back on a rear screen, using the one DVD drive 16.

In the above description, map data is transferred from the DVD drive 16 of the navigation system, and the area map data 100b is stored in the Memory card 18. Alternatively, by transferring the area map data 100b to the Memory card 18 in advance using, for example, a personal computer, the navigation system can be made without the DVD drive 16, having only the Memory card 18. In this case, when coordinates of a current position are contained in a portion overlapping with another map, a user is induced to insert a Memory card having a map sharing the overlapping portion recorded thereon.

In the above embodiment, a case is described where the whole map data is a map of Japan. However, map data used in the invention is not limited to a map of Japan.

In the above embodiment, a case is described where a destination is set in advance. Alternatively, the embodiment can also be implemented for a case where a destination is not set, by judging the area map change only by a current position.

In the above embodiment, an example is given where, when the adjacent area map data 100b is not stored in the Memory card 18, the navigation system displays a message to insert the DVD 100 into the DVD drive 16. Alternatively, the DVD 100 may be automatically inserted into the DVD drive 16. For example, if a DVD changer is provided that chooses a DVD from a box storing a plurality of DVDs and inserts the DVD into the DVD drive 16, a DVD can be automatically changed to the DVD 100 having map data recorded thereon.

While there has been described what are at present considered to be preferred embodiments of the invention, it will be understood that various modifications may be made thereto. Appended claims cover all modifications as fall within the true spirit and scope of the invention.

INDUSTRIAL APPLICABILITY

As described above, the invention has the great advantage of being able to smoothly change maps to be used for navigation and is useful as a navigation system, for example, installed on a vehicle, or the like.

The invention claimed is:

1. A navigation system comprising:
   a recording medium on which a plurality of partially overlapping maps are recorded;
   a reading unit for reading the plurality of partially overlapping maps from the recording medium;
   a storage unit for storing the plurality of partially overlapping maps and storing information to identify a portion of an adjacent map overlapping with a map being used for navigation; and
   a control unit for judging, based on coordinates of a current position and the information stored in the storage unit, whether the coordinates of the current position are contained in the overlapping portion or not, and for controlling, when the coordinates of the current position are judged to be contained in the overlapping portion, the storage unit to output the adjacent map sharing the overlapping portion.

2. The navigation system according to claim 1, wherein the reading unit reads the plurality of partially overlapping maps from a portable recording medium inserted therein.

3. The navigation system according to claim 2, wherein the control unit, when coordinates of a current position are judged to be contained in the overlapping portion and the adjacent map is not stored in the storage unit, induces a user to insert the recording medium into the reading unit.

4. The navigation system according to claim 1, wherein the storage unit is a memory card.

5. A navigation system comprising:
   a recording medium on which a plurality of partially overlapping maps are recorded;
   a display unit for displaying a map in a scrollable manner;
   a reading unit for reading the plurality of partially overlapping maps from the recording medium;
   a storage unit for storing the plurality of partially overlapping maps and storing information to identify a portion of an adjacent map overlapping with the map being displayed on the display unit; and
   a control unit for judging, based on an area displayed on the display unit and the information stored in the storage unit, whether the overlapping portion stored in the storage unit is contained in the area displayed on the display unit or not, and for controlling, when the overlapping portion is judged to be contained in the area displayed on the display unit, the storage unit to output the adjacent map sharing the overlapping portion.

6. A computer-readable storage medium storing:
   a plurality of partially overlapping maps; and
   identification information to identify a portion of a map overlapping with another map in each of the plurality of maps, the plurality of maps and the information being stored on the computer-readable storage medium in association with each other, the computer readable storage medium controlling a computer to display the maps.

* * * * *

UNITED STATES PATENT AND TRADEMARK OFFICE
CERTIFICATE OF CORRECTION

PATENT NO. : 7,729,851 B2
APPLICATION NO. : 11/568733
DATED : June 1, 2010
INVENTOR(S) : Atsushi Yamashita et al.

It is certified that error appears in the above-identified patent and that said Letters Patent is hereby corrected as shown below:

On the Title Page Item [56], References Cited, FOREIGN PATENT DOCUMENTS:

"JP 60-67818 A 4/1995" should read --JP 60-67818 A 4/1985--

Signed and Sealed this

Second Day of November, 2010

David J. Kappos
*Director of the United States Patent and Trademark Office*